United States Patent Office 3,591,558
Patented July 6, 1971

3,591,558
POLYMERS PREPARED FROM ORGANIC COMPOUNDS CONTAINING AN ACTIVE METHYL OR METHYLENE GROUP AND AN ORGANIC DIHALIDE AND METHOD OF PREPARATION
Derek Brown, Michael Edward Benet Jones, and William Ramsey Maltman, Runcorn, England, assignors to Imperial Chemical Industries Limited, London, England
No Drawing. Continuation of application Ser. No. 685,961, Nov. 27, 1967. This application Dec. 15, 1969, Ser. No. 882,354
Claims priority, application Great Britain, Dec. 12, 1966, 55,602/66
Int. Cl. C08g 15/00, 15/02, 25/00
U.S. Cl. 260—47R
11 Claims

ABSTRACT OF THE DISCLOSURE

A process for the production of a polymeric material by the polycondensation of an organic compound containing an active methyl or methylene group with a substantially equimolar amount of an organic dihalide, in the presence of specified proportions of a base. The process is preferably carried out in solution. Also, new polymeric materials which may be prepared by this process.

---

This application is a continuation of co-pending application Ser. No. 685,961, filed Nov. 27, 1967, and now abandoned.

This invention relates to the production of polymers by polycondensation involving the displacement of hydrogen atoms directly bound to carbon, and provides a method of obtaining an entirely new class of polymers.

According to the present invention, we provide a process for the production of polymeric materials which comprises treating at least one organic compound having an active methyl or methylene group with a substantially equimolar amount of one or more organic dihalides, wherein both halogen atoms are attached to aliphatic carbon atoms, in the presence of at least two moles of a base per mole of the said organic compound. Reaction in a solvent for the organic compound and the organic dihalide is preferred.

The reaction is a polycondensation involving the loss of two halogen atoms from the dihalide and two hydrogen atoms from the active methyl or methylene group of the other compound. The two divalent residues so obtained link together alternately to form the polymer chain. Thus the polycondensation reaction involves chain building by the formation of carbon-carbon bonds.

According to a further embodiment of the invention we provide the polymers prepared by the above process.

Compounds having active methyl or methylene groups are defined as those wherein the carbon atom of the methyl or methylene group is linked directly to an atom forming part of an unsaturated group. The unsaturated group may be an aromatic nucleus or may comprise a diatomic unit, preferably one in which the atoms are dissimilar, the more electronegative atom being on the far side of the unsaturated group from the methyl or methylene group.

The unsaturated linkage may involve a double or triple bond and may be participating in conjunction. In the case of compounds having an active methylene group, the carbon atom of the methylene group may be linked to either one or two atoms forming part of unsaturated groups which, in the latter case, may be the same or different.

Examples of common unsaturated groups are

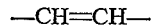

nitrile, carbonyl, sulphonyl and aromatic groups.

Examples of suitable compounds are cyclopentadiene, diphenylmethane, fluorene, diesters of malonic acid (e.g. diethyl malonate), malononitrile, benzyl cyanide, ortho- and para-toluinitrile, ethyl cyanide, methyl cyanide, bis-(alkyl-sulphonyl) methanes e.g. bis(n-butylsulphonyl) methane, nitromethane, p-nitrotoluene, di-p-tolyl sulphone, phenyl p-tolyl sulphone, N,N-dimethyltoluene-p-sulphonamide, methyl ethyl ketone, acetone, acetylacetone and ethyl acetoacetate.

With regard to the organic dihalides which are the other participants in the polycondensation, we have obtained our best results with those compounds in which each halogen is attached to an aliphatic carbon linked directly to an aromatic nucleus, e.g. as in bis(halomethyl) derivatives of aromatic compounds. Preferably the halogen is chlorine or bromine. Examples of dihalides are bis(p-chloromethyl-phenyl)ether, 1,2 - bis(p-chloromethylphenoxy) ethane, 2,5 - dimethoxy - α,α' - dichloro-p-xylene, α,α'-dichloro-p-xylene, 2,5-dimethyl - 3,6 - dichloro-α,α'-dichloro-p-xylene, 2-nitro-α,α'-dichloro-p-xylene, 4,6-dimethyl - α,α' - dichloro-m-xylene, 2,4,6-trimethyl-α,α'-dichloro-m-xylene and α,α'-dibromo-p-xylene. However, simple aliphatic dihalides, e.g. 1,3-dibromopropane, may also be used.

We prefer the base to be a strong base. Examples are alkali metal alkoxides, particularly tertiary butoxides, e.g. potassium tertiary butoxide, alkali metal hydrides, e.g. sodium hydride, and alkali metal amides, e.g. sodamide. The alkali metal hydrides are preferred. If desired, proportions of base slightly in excess of two moles of base per mole of the compound containing active methyl or methylene groups, for example up to 10% by weight excess, may be used without disadvantage. However, no advantage is gained in using quantities in excess of this, and in some cases it may be found to be deleterious.

As is usual in most polycondensation reactions, the formation of high molecular weight products is encouraged by the use of substantially equimolar amounts of the two reagents (i.e. the compound with the methyl or methylene group and the organic dihalide). Digression from equimolar concentrations generally leads to lower molecular weight products.

Any solvent used must be inert in that it must not react with either of the polymer forming reagents or with the base to such an extent that polymerisation is prevented, and preferably it has little or no chain transfer effect. It is also preferably a solvent, partial solvent or swelling agent for the polymeric product since this promotes the formation of high molecular weight products. Examples of suitable solvents are benzene, liquid ammonia and polar, aprotic, organic solvents, for example hexalkylphosphoramides, e.g. hexamethylphosphoramide, tetramethylenesulphone and the dialkyl amides of the lower fatty acids, e.g. dimethylacetamide. Mixtures of solvents may be used.

Preferably the solvent is present in at least sufficient quantities to allow the reaction mixture to be stirred with reasonable ease throughout the polymerisation reaction.

Preferably, the reaction is effected in an inert atmosphere and under moisture-free conditions. For example, it may be effected under dry nitrogen. In the reaction, tri or higher functional reagents may be used, if desired, to encourage branch chain formation or cross-linking. Mono-functional reagents may also be used, if desired, to control molecular weight.

We have found it advantageous first to prepare a mixture of the base and the organic compound with the methyl or methylene group in the solvent. Where the mixing is exothermic, it is generally desirable to apply cooling. Profitably, in such cases, the mixing is effected below 10° C. The dihalide may then be added, either as such or in solution, to this mixture with stirring. The addition is preferably slow, particularly during the latter stages of the reaction when the reaction mixture may be highly viscous in nature. Thorough stirring is desirable at all stages of the reaction.

The reaction can proceed at room temperature and at atmospheric pressure, and may be exothermic in nature. Where any exotherm is not controlled, some insoluble byproduct may be formed, and it is therefore generally advantageous to apply cooling to the reaction mixture. The preferred reaction temperature will depend on the nature of the reagents, but temperatures in the range of from 0° to 50° C. have been found generally suitable. Should insoluble by-product be formed, separation may be effected, for example, by coprecipitating the by-product and the polymer and then dispersing them in a compound which is a solvent for the polymer, but a non-solvent for the by-product.

In accordance with a further embodiment of the present invention we provide polymers having polymeric chains consisting essentially of repeating units having the structure:

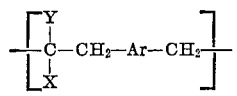

where X is a monovalent radical being an aromatic group or an unsaturated group in which the atom by which it is attached to the carbon atom is unsaturated; Y is H or a monovalent radical which may, if desired, be an aromatic group or an unsaturated group in which the atom by which it is attached to the carbon atom is unsaturated; or X and Y together form a divalent group having unsaturated; or X and Y together form a divalent group having unsaturation $\alpha,\beta$ to the carbon atom; and Ar is a divalent aromatic radical, the —$CH_2$— groups preferably being attached to non-adjacent carbon atoms on Ar.

Common examples of X are phenyl and derivatives thereof wherein one or more of the hydrogen atoms have been replaced by, for example, halogen atoms, nitro groups, sulphonamide groups, nitrile groups, alkoxy groups or alkyl groups; groups containing two or more aromatic rings e.g.

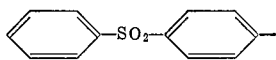

—CN; —$NO_2$; —COR; —$SO_2R$; —COOR; —$SO_2OH$; and —$SO_2OR$, where R is an alkyl group. Y may be selected from, for example, H, any of the possibilities for X, and hydrocarbyl and hydrocarbyloxy groups, e.g. alkyl and alkyloxy groups. The group

may also be, for example,

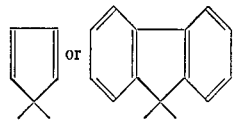

Ar may be, for example, a m- or p-phenylene group, a substituted m- or p-phenylene group wherein one or more of the remaining hydrogen atoms have been replaced by, for example, halogen atoms, alkyl, e.g. methyl groups, alkoxy, e.g. methoxy groups, or nitro groups, a group derived from a fused aromatic ring system, e.g. naphthalene, or a divalent group of the structure:

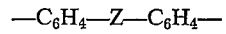

wherein Z is a direct linkage or a divalent linking group, for example —O—, —S—, —$(CH_2)_n$—, where $n$ is a positive integer, e.g. from 1 to 10; or —O—$(CH_2)_n$—O—, where $n$ is a positive integer, e.g. from 1 to 10.

These polymers have properties which depend upon the nature of the repeating units. A particularly preferred polymer is that having polymeric chains consisting essentially of repeating units of the structure:

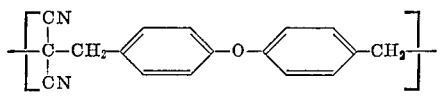

which may be prepared, according to the process of the present invention, from malonitrile and bis(p-chloromethylphenyl) ether.

This polymer may be shaped by solvent casting or solvent spinning, e.g. from chloroform, or may be shaped by melt processing at about 200° C. or higher. Cast films are transparent and strong, and a degree of cross-linking may be achieved by heating such cast films or by forming the films from the melt.

Many of the other polymers of the present invention are also suitable for fabrication to, e.g. films and moulded articles.

The polymers may be mixed with heat and light stabiliser, fillers, lubricants, mould release agents, pigments, colourants and like additives for polymers and may be blended with other polymers, natural or synthetic, if desired.

The invention is now illustrated but in no way limited by the following examples in which all parts are expressed in parts by weight.

By reduced viscosity, in the examples, we mean the value obtained for $$\frac{t-t_0}{t_0 C}$$

where $t$ is the flow time of a given volume of a solution of the polymer of concentration C gms./decilitre through a specified viscometer, and $t_0$ is the flow time of the same volume of pure solvent through the same viscometer under the same conditions. All values quoted are in decilitres/gms.

EXAMPLE 1

Preparation of polymer of repeating units:

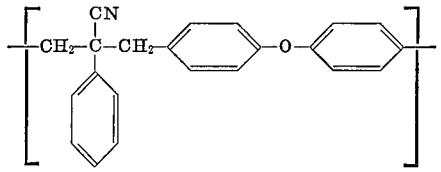

1.17 parts benzyl cyanide (reagent grade as supplied) were dissolved in 15–20 parts of dry dimethylacetamide in a two-necked round-bottomed flask which had previously been flame-dried. The solution was stirred vigorously magnetically, and nitrogen was continuously flushed through. 2.24 parts of potassium tert-butoxide were added slowly as a solid and stirring continued to assist dissolution. With the solution maintained in a water bath at room temperature, 2.67 parts bis(p-chloromethylphenyl) ether were added as a solid over a period of approximately 5 minutes. A reaction exotherm was apparent (the temperature of the solution rose to between 30 and 40° C.) and the solution became markedly viscous. It was poured into a well-stirred excess of methanol and the precipitated polymer filtered off, partially dried and dissolved in 10–20 parts m-cresol. This solution was filtered free from a small proportion of insoluble gel particles, and the filtrate reprecipitated into methanol. The white polymer was filtered, washed thoroughly with methanol and dried in a vacuum oven at 100–120° C. for several hours.

The reduced viscosity of the polymer so obtained was determined on a solution of 1 gm. thereof in 100 ml. of m-cresol at 30° C. using a simple Ostwald U-tube viscometer. This was found to be 0.33.

The analysis data on the product were as follows.—Found (percent): C, 82.3; H, 5.7; N, 4.7. Calculated (percent): C, 85.0; H, 5.5; N, 4.5.

Infra-red evidence also supports the structure shown; principally the C≡N stretching vibration at 2,240 cm.$^{-1}$, and the ether stretching vibration at 1,235 cm.$^{-1}$.

The polymer was amorphous and had a glass/rubber transition temperature (Tg) of 143° C. as determined by differential thermal analysis. One tenth and ten tenths Vicat softening temperatures were 137.5° C. and 145° C. respectively.

The material could be compression moulded and a clear sample was prepared at 230° C. Films could be cast from solution in m-cresol.

EXAMPLE 2

Preparation of polymer of repeating unit:

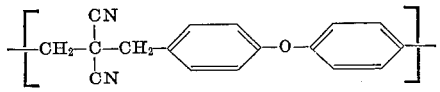

The experiment procedure was as in Example 1, apart from the addition of the dihalide which this time was rapid. The reaction was assumed to be almost instantaneous, the alkalinity of the solution having dropped to zero shortly after addition of the dihalide. The quantities of reactants used were 0.66 part of malononitrile (commercial sample distilled at 101.5° C. and approximately 20 mm. pressure), 2.24 parts potassium tert-butoxide and 2.67 parts bis(p-cloromethylphenyl) ether.

The polymeric product was amorphous and had a reduced viscosity (measured as in Example 1) of 0.6. The one tenth and ten tenths Vicat softening temperatures were 129° C. and 139° C.

A sample analysed as follows.—Found (percent): C, 77.9; H, 5.9; N, 11.1. Calculated (percent): C, 78.6; H, 4.6; N, 10.8.

An infra-red spectrum showed stretching frequencies at 2,250 cm.$^{-1}$ (C≡N) and 1,240 cm.$^{-1}$ (aryl ether).

A melt pressed film (255° C.) of the polymer was yellow and transparent but showed no noticeable signs of decomposition.

EXAMPLE 3

Preparation of polymer of repeating unit

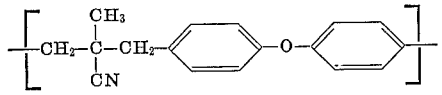

Reactant quantities were 0.55 part ethyl cyanide (reagent grade as supplied), 1.0 part of a commercially available 50% dispersion of reagent grade sodium hydride in oil and 2.67 parts bis(p-chloromethylphenyl) ether. The procedure was as previously except that sodium hydride was used in place of potassium tert butoxide and the dihalide addition was made over a period of approximately 1 hour with the solution in a water bath at 40–50° C. The final stages of addition of halide were carried out with extreme care to avoid gel formation as the solution became very viscous.

A polymer obtained in this manner had a reduced viscosity (measured as in Example 1) of 0.85 and was amorphous. A melt pressed film (230° C.) was clear and tougher than those described in Examples 1 and 2.

EXAMPLES 4 AND 5

Preparation of polymers having the repeating units illustrated in Examples 1 and 2.

(4) Benzyl cyanide and (5) malononitrile were treated by a similar procedure to that described for ethyl cyanide in Example 3. In both cases solutions of extremely high viscosities were obtained and even after reprecipitation (the polymers were soluble in m-cresol only after prolonged heating) the products were coloured yellow-brown. Reduced viscosities in m-cresol were 1.24 for benzyl cyanide in Example 4 and 1.08 for malononitrile in Example 5.

Melt pressed film could be obtained from both materials.

EXAMPLES 6–13

A further series of polymers were prepared by varying the nature of the compound (A) containing the active methyl or methylene group and of the dihalide (B).

Results are summarised in the table below:

| Example | Compound A | Compound B | Reduced viscosity of polymer | Comments |
| --- | --- | --- | --- | --- |
| 6 | Fluorene | Bis(p-chloro-methylphenyl) ether | 0.78 | Tg 138° C., amorphous. Prepared by process of Example 3 using NaH. Clear films obtained by melt pressing. |
| 7 | Methyl cyanide | do | 0.12 | Potassium tertiary butoxide used as base and process as per Example 1. |
| 8 | Diethyl malonate | α,α'-Dibromo-p-xylene | 0.08 | Do. |
| 9 | Fluorene | α,α'-Dichloro-p-xylene | 0.11 | NaH used as base and process as per Example 1. |
| 10 | Acetone | Bis(p-chloro-methylphenyl) ether | 0.15 | Do. |
| 11 | Methyl ethyl ketone | do | 0.4 | Do. |
| 12 | Acetyl acetone | do | 0.15 | Do. |
| 13 | Diethyl malonate | do | 0.83 | Do. |

In Example 14 and the following examples, melting points of polymers were determined on a hot-stage microscope and viscosities were determined on solutions of 1 gm. of polymer in 100 ml. of chloroform unless otherwise stated, at 25° C. using an Ubbelohde viscometer. Proton magnetic resonance spectra were recorded in deutero-chloroform.

EXAMPLE 14

A solution of phenyl p-tolyl sulphone (2.32 parts) in dimethyl acetamide (20 parts) was prepared in a flask equipped with a nitrogen bleed, a magnetic stirrer, and an exit guarded by a calcium chloride tube. Nitrogen was bubbled through the solution for 10 minutes, and potassium t-butoxide (2.24 parts) then added. The red mixture so obtained was stirred at room temperature for ½ hour, and then cooled in an ice/water bath. Bis-(p-chloromethylphenyl) ether (2.67 parts) was then added in small portions over 5 minutes, and stirring continued for a further period of one hour with the ice-bath removed. The brown coloured mixture obtained was then added dropwise to excess methanol (approx. 1000 parts by weight) with vigorous stirring of the methanol during, and after, the addition. The white precipitate obtained was filtered off, washed successively with methanol, water and methanol, then dried for 16 hours at 40° C. and 12 mm. pressure.

The polymeric product was obtained as a white solid (1.62 parts) and was characterised as follows: melting point 140–150°; infra-red absorption bands at 1300 cm.$^{-1}$ and 1240 cm.$^{-1}$ indicative of sulphone, and aromatic ether groups respectively; analysis data—Found (percent): C, 75.08; H. 6.06; S, 6.48; Cl, 2.97. Calculated (percent): C, 76.03; H, 5.20; S, 7.52. Reduced viscosity=0.095.

EXAMPLE 15

Following throughout the procedure of Example 14 o-tolunitrile (1.17 parts) was treated with potassium t-butoxide (2.24 parts in dimethyl acetamide (20 parts) to give a reddish brown mixture. To this mixture was added bis(p-chloromethylphenyl ether (2.67 parts). The polymeric product was obtained as an off-white powder (0.4 part) and was characterised as follows: Melting point 90–100°; infra-red absorption bands at 2200 cm.$^{-1}$ and 1240 cm.$^{-1}$ indicative of cyanide and aromatic ether groups respectively;

Analytical data—Found (percent): C, 81.16; H, 6.62; N, 3.17. Calculated (percent): C, 84.9; H, 5.47; N, 4.51. Reduced viscosity=0.06.

EXAMPLE 16

The procedure for o-tolunitrile described in Example 15 was followed exactly for p-tolunitrile. The polymeric material obtained was a yellow powder (1.65 parts) and was characterised as follows: Melting point 140–150°; infra-red absorption bands at 2200 cm.$^{-1}$ and 1240 cm.$^{-1}$ indicate cyanide and aromatic ether groups respectively. Reduced viscosity 0.045.

EXAMPLE 17

Following the procedure of Example 14 nitromethane (0.61 part) was treated with potassium t-butoxide (2.24 parts) when no apparent reaction took place. To this mixture, which was stirred at room temperature, was added bis-(p-chloromethylphenyl) ether (2.67 parts) over a period of 1 minute. A very slight exotherm was noted, but there was no other immediate sign of reaction. The mixture was then left to stir for 18 hours under nitrogen at room temperature when an orange solution was obtained. This was poured into excess methanol and the polymeric product isolated as described in Example 14. It was a yellow powder with a reduced viscosity of 0.083.

EXAMPLE 18

Following the procedure of Example 14, bis-(n-butylsulphonyl) methane (2.56 parts) was treated with potassium t-butoxide (2.24 parts) in dimethyl acetamide (20 parts) to give a pale yellow mixture, the reaction being accompanied by a slight exotherm. This mixture was stirred at room temperature for 1 hour, then cooled in an ice/water bath, and bis-(p-chloromethylphenyl) ether (2.67 parts) added over 3 minutes. The reaction mixture was heated at 80° C. for one hour, and at 120° for a further hour, and then allowed to cool to room temperature. The mixture obtained was poured into excess methanol and the polymeric product isolated as described in Example 14. It was a white powder (0.6 part) and was characterised as follows: Melting point 80–90° C.; infra-red absorption bands at 1300 cm.$^{-1}$ and 1120 cm.$^{-1}$ (indicative of sulphone), and at 1240 cm.$^{-1}$ (indicative of aromatic ether). Reduced viscosity was 0.059.

EXAMPLE 19

Following throughout the procedure of Example 14, N,N-dimethyltoluene-p-sulphonamide (1.99 parts) was treated with potassium t-butoxide (2.24 parts) in dimethyl acetamide (20 parts). The black viscous mixture so obtained was cooled in an ice/water bath, and bis-(p-chloromethylphenyl) ether (2.67 parts) added in portions over 5 minutes. After the mixture had been stirred at room temperature for 1 hour, it was pale fawn in colour and contained suspended solid. The mixture was now stirred into excess methanol and the polymeric product isolated as described in Example 14. The polymer was obtained as an off white solid (0.3 part) and was characterised as follows: Melting point 130–135°; infra-red absorption bands at 1160 cm.$^{-1}$ and 1350 cm.$^{-1}$ indicating sulphonamide and at 1240 cm.$^{-1}$ indicating aromatic ether; reduced viscosity 0.08.

EXAMPLE 20

Following the procedure of Example 14, p-nitrotoluene (1.37 parts) was treated with potassium t-butoxide (2.24 parts) in dimethyl acetamide (20 parts) to give a dark coloured mixture. After ½ hour at room temperature this mixture was cooled in an ice-water bath, and bis-(p-chloromethylphenyl) ether (2.67 parts) added in portions over 5 minutes. The reddish mixture so obtained was heated to 70° C. for one hour, cooled to room temperature and stirred into excess methanol, and the polymeric product isolated as described in Example 14. It was a red/orange powder (1.03 part) and was characterised as follows: Melting point 80–100° C.; infra-red absorption bands at 1240 cm.$^{-1}$ indicative of aromatic ether; reduced viscosity 0.1.

EXAMPLE 21

Following the procedure of Example 14, benzyl cyanide (1.17 parts) was treated with potassium t-butoxide (2.24 parts) in dimethyl acetamide (20 parts). The orange solution obtained was cooled in an ice/water bath, and bis-(p-chloromethylphenyl) ether (2.67 parts) added in portions over 5 minutes. The mixture was allowed to warm up to room temperature and stirring continued for a further 2 hours. The orange mixture was poured into methanol and polymeric material isolated as described in Example 14. The polymer was a white powder (2.4 parts by weight), and was characterised as follows: Melting point 150–160°; infra-red absorption bands at 2200 cm.$^{-1}$ and 1240 cm.$^{-1}$ indicative of cyanide and aromatic ether groups respectively;

Analytical data—Found (percent): C, 81.91; H, 6.01; N, 4.72; Cl, 1.82. Calculated (percent): C, 84.9; H, 5.47; N, 4.51. Reduced viscosity 0.155. The proton magnetic resonance of these broad singlets at 6.8τ, 3.20τ and 2.80τ with integrated intensities in the ratio of approximately 4:8:5 respectively was in agreement with the proposed structure.

EXAMPLE 22

Liquid ammonia (about 75 parts) was condensed in a round bottom flask equipped with a stirrer, an ammonia inlet, an inlet closed by a suba seal, and a Dry-Ice condenser with the exit connected to a soda-lime tower. Ferric nitrate (0.025 part) and sodium (0.46 part) were added successively to the ammonia, and the mixture stirred at the boiling point of liquid ammonia for 1 hour when the sodium had all dissolved. Benzylcyaanide (1.17 parts) was added to the grey mixture so obtained, and this mixture stirred for ½ hour giving a green/grey mixture. Bis-(p-chloromethylphenyl) ether (2.67 parts) was then added to the solid over 3 minutes, the Dry Ice removed from the condenser, and the purple mixture stirred until all the ammonia had evaporated. Dimethyl acetamide (30 parts) was then added, and the mixture slurried into excess methanol (1000 parts) with vigorous stirring. The solid material obtained was filtered off, treated with dimethyl acetamide (20 parts) and the resulting mixture filtered into excess methanol (1000 part) with vigorous stirring. The polymeric material so obtained was filtered, washed successively with methanol, water and methanol, and dried for 16 hours at 40° C./12 mm. It was a white solid and was characterised as follows: Melting point 150–165° C., infra-red absorption similar to that obtained from the material in Example 21.

Analytical data—Found (percent): C, 82.54; H, 6.79; N, 4.97. Calculated (percent): C, 84.9; H, 5.47; N, 4.51. Reduced viscosity 0.23. The proton magnetic resonance spectrum was very similar to that obtained from the polymer isolated in Example 21.

EXAMPLE 23

The procedure of Example 21 was followed exactly except that 2,5-dimethoxy- α α'-dichloro-p-xylene (2.35 parts) was used in place of the bis(p-chloromethylphenyl) ether. The polymeric product was a white powder (1.5 parts), and was characterised as follows: Melting point 85–100° C., infra-red absorption at 2200 cm.$^{-1}$ (indicates cyanide), and at 1220 cm.$^{-1}$ and 1050 cm.$^{-1}$ (indicates aromatic-methoxy group); reduced viscosity 0.096.

EXAMPLE 24

The procedure of Example 21 was followed exactly except that α,α'-dichloro-p-xylene (1.75 parts) was used in place of the bis-(p-chloromethylphenyl) ether. The polymeric material was obtained as a white powder (1.9 parts) which was partially dissolved in chloroform (20 parts), and the resulting mixture filtered into excess methanol (500 parts) to give a chloroform insoluble fraction (1 part) and a chloroform soluble fraction (0.9 part). The latter was characterised as follows: Melting point 160–175° C.; infra-red absorption band at 2220 cm.$^{-1}$ indicative of cyanide.

Analytical data—Found (percent): C, 87.52; H, 5.88; N, 6.28. Calculated (percent): C, 87.7; H, 5.93; N, 6.38. Reduced viscosity 0.165. The proton magnetic resonance of 3 broad singlets at 2.80τ, 3.20τ and 6.88τ of approximately equal integrated intensity was in agreement with the proposed structure. The sample showed no crystallinity by X-ray examination, both as formed and on annealing.

EXAMPLE 25

The procedure of Example 21 was followed exactly except that 2,5-dichloro-3,6-dimethyl-α,α'-dichloro-p-xylene (2.72 parts) was used in place of bis-(p-chloro-methylphenyl) ether. The polymeric material was obtained as a white powder (3.3 parts), and was characterised as follows: Melting point 188–200° C., infra-red absorption band at 2220 cm.$^{-1}$ (indicative of cyanide); reduced viscosity 0.035.

EXAMPLE 26

The procedure of Example 21 was followed except that 4,6-dimethyl-α,α'-dichloro-m-xylene (2.03 parts) was used in place of bis-(p-chloromethylphenyl) ether. The polymeric product was obtained as a white powder (3.8 parts) and was characterised as follows: Melting point 95–100°, infra-red absorption band at 2220 cm.$^{-1}$ (indicative of cyanide); reduced viscosity 0.025.

EXAMPLE 27

The procedure of Example 21 was followed except that 2-nitro-α,α'-dichloro-p-xylene (2.20 parts) was used in place of bis(p-chloromethylphenyl) ether. The polymeric product was obtained as a brown powder (1.4 parts), and was characterised as follows: Melting point 173–185° C., infra-red absorption bands at 2200 cm.$^{-1}$ indicates cyanide and at 1525 cm.$^{-1}$ indicate the nitro group; reduced viscosity 0.059.

EXAMPLE 28

The process of Example 2 was repeated except that 2,4,6-trimethyl-α,α'-dichloro-m-xylene (2.17 parts) was used as the dihalide. The polymeric product was obtained as a white powder (3.1 parts) and was characterised as follows: Melting point 180–190° C., infra-red absorption band at 2200 cm.$^{-1}$ (indicative of cyanide); reduced viscosity 0.023.

EXAMPLE 29

The process of Example 21 was repeated except that 1,2-bis(p-chloromethylphenoxy) ethane (3.11 parts) was used as the dihalide. The polymeric product was obtained as a white solid (1.7 parts) and was characterised as follows: Melting point 93–104°, infra-red absorption bands at 2250 cm.$^{-1}$ indicating cyanide and at 1240 and 1060 cm.$^{-1}$ indicating the ether groups; reduced viscosity 0.092.

EXAMPLE 30

Following the procedure of Example 14, benzyl cyanide (1.17 parts) was treated with potassium t-butoxide (1.12 parts) in dimethyl acetamide (20 parts). After stirring at room temperature for half an hour, the mixture was cooled and an ice/water bath, and α,α'-dichloro-p-xylene (0.875 part) added as the solid. After stirring for a further 5 minutes, the mixture was allowed to come to room temperature, and stirring continued for half an hour. Potassium t-butoxide (1.12 parts) was then added. This mixture was stirred at room temperature for half an hour and cooled in an ice/water bath. α,α'-Dichloro-p-xylene (0.875 part) was then added and the mixture stirred at room temperature for 1 hour. It was then added to excess methanol as described in Example 14, and the resulting polymeric material divided into chloroform soluble (0.5 part) and chloroform insoluble (0.6 part) fractions as described in Example 24. The chloroform soluble fraction had a similar melting point, infra-red spectrum and viscosity to the chloroform soluble fraction described in Example 24.

EXAMPLE 31

Following the procedure of Example 14, benzyl cyanide (1.17 parts) in dimethyl acetamide (15 parts by weight) was treated with potassium t-butoxide (2.24 parts), and the mixture so obtained stirred at room temperature for 1 hour. It was then transferred under a nitrogen blanket to a pressure equalised dropping funnel, and added over 20 minutes to a stirred solution of α,α'-dichloro-p-xylene (1.75 parts) in dimethyl acetamide under nitrogen contain in a flask cooled in an ice/water bath. After the addition, the mixture was allowed to come to room temperature, stirred for a further half an hour and then added to excess methanol as described in Example 14. The polymeric product so obtained was divided into a chloroform soluble (0.3 part) and a chloroform insoluble (0.4 part) fraction. The chloroform soluble fraction had a similar melting point, infra-red spectrum, and reduced viscosity to the corresponding fractions described in Examples 24 and 30.

EXAMPLE 32

The procedure of Example 23 was followed exactly except that a 50% dispersion of sodium hydride in oil (1.5 parts) was used in place of the potassium t-butoxide. The polymeric product was obtained as a white solid (1.1 parts) which was characterised as follows: Melting point 130–150°; infra-red spectrum similar to that obtained in Example 23; reduced viscosity 0.064.

EXAMPLE 33

Following the procedure of Example 14, a solution of benzyl cyanide (1.17 parts) in benzene (20 parts) was treated with potassium t-butoxide (2.24 parts) and the resulting mixture stirred at room tempertaure for 1 hour. To this mixture, 2,5-dimethoxy-α,α'-dichloro-p-xylene (2.35 parts) was added at a rate such that the temperature of the mixture did not exceed 30.° As the reaction proceeded benzene (15 parts) was added, and when the addition was complete, the mixture was heated to 100° for 5 minutes. The resulting mixture was added to methanol and the polymeric product isolated as described in Example 14. It was a white powder (0.48 part) and was characterised as follows: Melting point 120–130°, infra-red spectrum similar to those obtained in Examples 23 and 32; reduced viscosity 0.1.

EXAMPLE 34

Cyclopentadiene (0.66 part) was added to a mixture of dimethyl acetamide (20 parts), and potassium t-butoxide (2.24 parts) in a flask equipped with a magnetic stirrer, a condenser guarded by a calcium chloride tube, and a nitrogen bleed. After the slight exotherm had subsided, the mixture was stirred at room temperature for 15 minutes, then bis-(p-chloromethylphenyl) ether (2.67 parts) added in portions over 5 minutes with vigorous stirring. The exothermic reaction caused the mixture to become warm, and after 15 minutes when it was again at room temperature, the mixture was added to excess methanol and the polymeric product isolated as described in Example 14. It was a creamy white solid and was characterised as follows:-Melting Point above 295° C., infra-red absorption band at 1240 cm.$^{-1}$ indicative of aromatic ether; reduced viscosity 0.42.

EXAMPLE 35

A solution of malonitrile (6.6 parts) in dry hexamethyl phosphoramide (170 parts) was thoroughly purged with dry nitrogen, and cooled to 0° C. under an atmosphere of nitrogen. Sodium hydride (10 parts of a mineral oil suspension containing approximately 50% by weight of sodium hydride) was then stirred slowly into the mixture over a period of 30 mins. and the temperature of the mixture was maintained below 10° C. Stirirng under nitrogen was continued for a further 1 hour at a temperature in the region of 5° C. after which period hydrogen evolution had ceased. Bis-(p-chloromethylphenyl) ether (26.7 parts) was then stirred into the mixture over a period of 45 mins., the temperature again being maintained below 10° C. After the addition the mixture was allowed to warm up to 20° C. and stirred at this temperature for approximately 3 hours. Samples withdrawn at intervals during this 3 hour period showed an increase in solution viscosity as the reaction progressed. After the 3 hours stirring period hydrogen evolution had virtually ceased and the mixture was poured slowly, with vigorous stirring, into excess methanol to give the polymeric product as a white fibrous material which was washed with fresh methanol in the usual way, then dried at 40° C. under 12 mm. Hg pressure for 48 hours. The yield of the polycondensate was 25.5 parts and the material was characterised as follows—Reduced viscosity: 1.2. Infra-red absorption: essentially identical to that of Example 2, N.M.R. absorption: at 2.6τ (doublet), 3.0τ (doublet) and 6.75τ with an integral ratio of aromatic protons to aliphatic of 2:1.

Elemental analysis.—Found (percent): C, 75.05; H, 5.3; N, 9.55; Cl, 0.4 ($C_{17}H_{12}N_2O$)$_n$ requires (percent): C, 78.45; H, 4.65; N, 10.75.

Clear films of the polymer were obtained by solution casting from chloroform. Tensile tests on these films showed an initial modulus of 1.25×10$^{10}$ dynes/sq.cm. a breaking stress of 6×10$^8$ dynes/sq.cm. and a breaking strain of 7%.

Clear, but yellow, films of the polymer were obtanied by melt pressing at 220° C. at a pressure of 2000 p.s.i. These melt fabricated films were insoluble in all solvents investigated. Tensile tests showed an initial modulus 1.59×10$^{10}$ dynes/sq.cm. and a breaking stress of 8.4×10$^8$ dynes/sq.cm. Melt fabricated mouldings were examined by the Vicat Penetration test and gave the following results:

| Moulding time at 220° C.: | One tenth penetration, degrees C. |
|---|---|
| 3 mins. | 112 |
| 1 hr. | 135 |
| 2 hr. | 141 |

EXAMPLE 36

The procedure of Example 35 was followed except that 1,3-dibromopropane (20.2 parts) was used instead of the bis-(p-chloromethylphenyl) ether. The polycondensate (3.9 parts) was obtained as a white powder and characterised as follows—Reduced viscosity (measured using a 1% solution of dimethyl formamide at 25° C.): 0.45. Infra-red absorption: at 2200 cm.$^{-1}$ (indicative of cyanide).

Elemental analysis.—Found (percent): C, 65.85; H, 6.40; N, 25.5; Br, 0.7. ($C_6H_6H_2$)$_n$ requires (percent): C, 67.91; H, 5.67; N, 26.42.

What we claim is:

1. A process for the production of polymeric materials which comprises heating (1) at least one organic compound having an active methyl or active methylene group wherein the carbon atom of the methyl or methylene group is linked directly to a carbon or sulphur atom forming part of an unsaturated group with (2) a substantially equimolar amount of at least one organic dihalide having a formula selected from the group consisting of:

$$\text{Hal}—CH_2—R'—CH_2—\text{Hal}$$
and
$$\text{Hal}—CH_2—Ar—CH_2—\text{Hal}$$

where Hal is a halogen atom, R' is alkylene and Ar is selected from the group consisting of m- and p-phenylene, substituted m- and p-phenylene wherein the substituents are selected from the group consisting of halogen, lower alkyl, lower alkoxy and nitro, divalent radicals of fused aromatic ring systems and divalent groups having the structure —$C_6H_4$—Z—$C_6H_4$— where Z is selected from the group consisting of —O—, —S—, —(CH$_2$)$_n$— and —O(CH$_2$)$_n$O— where n is a positive integer of from 1 to 10, in solution in an inert polar aprotic organic solvent and in the presence of at least two moles per mole of said organic compound of a base selected from the group consisting of hydrides, amides and alkoxides of alkali metals, the active methyl or methylene group in compound (1) and the halogen atoms in compound (2) being the sole reactive substituents so that a polycondensation involving the loss of two halogen atoms from compound (2) and two hydrogen atoms from compound (1) occurs with the formation of carbon to carbon bonds.

2. A process according to claim 1 wherein the organic compound containing an active methyl or methylene group is selected from the group consisting of cyclopentadiene, fluorene, diethyl malonate, malonitrile, benzyl cyanide, o-tolunitrile, p-tolunitrile, ethyl cyanide, methyl cyanide, bis(n-butylsulphonyl) methane, N,N-dimethyltoluene-p-sulphonamide, nitromethane, p-nitrotoluene, phenyl-p-tolyl sulphone, methyl ethyl ketone, acetone and acetylacetone, and wherein the organic dihalide is selected from 1,3-dibromopropane, bis(p-chloromethylphenyl) ether; 1,2-bis(p-chloromethylphenoxy)ethane; 2,5-dimethoxy-α,α'-dichloro-p-xylene; α,α'-dichloro-p-xylene; 2,5-dimethyl-3,6-dichloro-α,α'-dichloro-p-xylene; 2-nitro-α,α'-dichloro-p-xylene; 4,6 - dimethyl-α,α'-dichloro-m-xylene; 2,4,6-trimethyl - α,α' - dichloro-m-xylene; and α,α' - dibromo-p-xylene.

3. A process according to claim 2 wherein the organic compound containing an active methyl or methylene group is malonitrile, and the organic dihalide is bis(p-chloromethylphenyl) ether.

4. A process according to claim 1 wherein the base is selected from the group consisting of potassium tertiary-butoxide, sodium hydride and sodamide, and said compound (1) is selected from the group consisting of compounds having a methyl or methylene group, the carbon atom of which is linked directly to a radical selected from the group consisting of aromatic nuclei, carbonyl, sulphonyl, vinylene (—C=CH—) and nitrile.

5. A process according to claim 1 wherein the solvent is also a solvent, partial solvent, or swelling agent for the polymeric product.

6. A process according to claim 1 wherein the solvent is selected from the group consisting of hexamethylphosphoramide and dimethylacetamide.

7. A process according to claim 1 when effected in two stages, the first stage being to mix the organic compound containing the active methyl or methylene group and the base in solution in a solvent, and the second stage being the addition of the organic dihalide to the said mixture, and consequent polymerization, at a temperature in the range 0° to 50° C.

8. A process according to claim 7 wherein the organic dihalide is added in solution in a solvent.

9. A film-forming polymer consisting essentially of repeating units having the structure

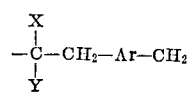

wherein —X is selected from the group consisting of phenyl; substituted phenyl wherein the substitution is selected from the group consisting of halogen, nitro, sulphonamide, nitrile, lower alkoxy, lower alkyl and phenylsulphonyl; —CN, —NO₂, —COR, —SO₂R and —COOR; and —Y is selected from the group consisting of —H, —R and —X where R is alkyl, or X and Y together consist of a divalent radical selected from the group consisting of

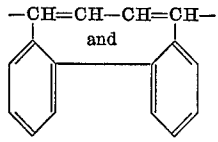

and Ar is selected from the group consisting of m- or p-phenylene, substituted m- or p-phenylene wherein the substitution is selected from the group consisting of halogen, alkyl, alkoxy and nitro,

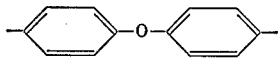

and

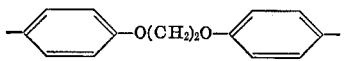

10. A polymer according to claim 9 wherein X and Y are each —CN, and Ar has the structure:

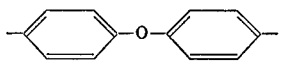

11. A shaped article formed from a polymer according to claim 9.

References Cited
UNITED STATES PATENTS

| | | | |
|---|---|---|---|
| 3,345,332 | 10/1967 | Hoyt et al. | 260—47 |
| 3,347,825 | 10/1967 | Hoyt et al. | 260—47 |
| 3,369,058 | 2/1968 | Keenan | 260—872 |

WILLIAM H. SHORT, Primary Examiner

L. L. LEE, Assistant Examiner

U.S. Cl. X.R.

117—161R, 161UN, 161UC; 260—2R, 33.8R, 50, 62, 63HA 78.4N, 79.3M, 93.1